United States Patent [19]

Shimokuni

[11] Patent Number: 5,576,917
[45] Date of Patent: Nov. 19, 1996

[54] CARTRIDGE FOR CONTAINING RECORDING MEDIUM AND HAVING L-SHAPED PROJECTION WELDED IN L-SHAPED RECESS WITH EXCESS MATERIAL ACCOMMODATED IN GAP THEREBETWEEN

[75] Inventor: Kenji Shimokuni, Miyagi, Japan

[73] Assignee: Sony Corporation, Tokyo, Japan

[21] Appl. No.: 493,510

[22] Filed: Jun. 22, 1995

Related U.S. Application Data

[63] Continuation of Ser. No. 255,072, Jun. 7, 1994, abandoned, which is a continuation of Ser. No. 988,485, Dec. 10, 1992, abandoned.

[30] Foreign Application Priority Data

Dec. 16, 1991 [JP] Japan ................................ 3-331050

[51] Int. Cl.⁶ .......................... G11B 23/02; G11B 23/027; B23K 26/00; B65D 6/00
[52] U.S. Cl. .............................. 360/132; 29/806; 220/359; 242/347
[58] Field of Search ........................ 360/132, 133; 242/194, 197, 199, 347, 348; 29/737, 806, DIG. 28; 369/291; 220/4.21, 4.01, 359

[56] References Cited

U.S. PATENT DOCUMENTS

| | | | |
|---|---|---|---|
| 3,495,787 | 2/1970 | Wallace | 242/199 |
| 3,642,228 | 2/1972 | Tollkuhn | 242/199 |
| 3,848,265 | 11/1974 | Biery et al. | 242/199 |
| 3,934,842 | 1/1976 | Posso | 242/199 |
| 3,980,256 | 9/1976 | Schwartz et al. | 242/199 |
| 4,166,593 | 9/1979 | Milants | 242/199 |
| 4,249,710 | 2/1981 | Dobbs et al. | 242/199 |
| 4,264,166 | 4/1981 | Morris | 354/62 |
| 4,566,653 | 1/1986 | Bettinger et al. | 242/199 |
| 4,700,254 | 10/1987 | Oishi et al. | 360/132 |
| 4,756,490 | 7/1988 | Newell | 242/199 |
| 4,868,699 | 9/1989 | Kingsbury et al. | 360/133 |
| 4,916,567 | 4/1990 | Grobecker et al. | 360/133 |
| 4,989,806 | 2/1991 | Eggebeen | 360/132 |
| 5,006,948 | 4/1991 | Fukunaga et al. | 360/133 |
| 5,081,556 | 1/1992 | Ikebe et al. | 360/133 |
| 5,199,593 | 4/1993 | Kita | 220/359 |

FOREIGN PATENT DOCUMENTS

| | | | |
|---|---|---|---|
| 2274990 | 9/1976 | France . | |
| 2541248 | 8/1984 | France . | |
| 9014777 | 12/1991 | Germany . | |
| 4-85532 | 3/1992 | Japan . | |
| 4-121734 | 4/1992 | Japan . | |
| 2210352 | 6/1989 | United Kingdom | 360/132 |
| 2262276 | 6/1993 | United Kingdom . | |

*Primary Examiner*—Stuart S. Levy
*Assistant Examiner*—Craig A. Renner
*Attorney, Agent, or Firm*—Jay H. Maioli

[57] ABSTRACT

A recording medium containing cartridge comprises a first casing shell having a recess formed proximate a side wall thereof and a second casing shell matingly fitting with the first casing shell. The second casing shell has a projection formed at a location corresponding to the recess formed in the first casing shell. A dimension of a distal surface of the projection contacting a bottom of the recess is made less than a corresponding dimension of the bottom of the recess. This leaves a gap that safely accommodates a burr formed during a welding process that joins the casing shells together. First and second reels are rotatably mounted between the first and second casing shells and tape is wound therebetween.

7 Claims, 6 Drawing Sheets

5,576,917

CARTRIDGE FOR CONTAINING RECORDING MEDIUM AND HAVING L-SHAPED PROJECTION WELDED IN L-SHAPED RECESS WITH EXCESS MATERIAL ACCOMMODATED IN GAP THEREBETWEEN

This is a continuation of application Ser. No. 08/255,072 filed Jun. 7, 1994, now abandoned, which is a continuation of application Ser. No. 07/988,485 filed Dec. 10, 1992now abandoned.

BACKGROUND OF THE INVENTION

1. Field of the Invention

The present invention relates generally to a recording medium containing cartridge for a recording/reproducing apparatus. Specifically, the present invention relates to a recording medium containing cartridge in which a casing is constructed so as to prevent certain problems described below.

2. Description of the Prior Art

Various types of recording medium containing cartridge are well known in the art for containing reels of magnetic tape for convenient use thereof, such as compact cassettes and microcassettes, for example. Such tape cassettes usually employ a casing comprising upper and lower halves which are mutually joined for rotatably mounting tape supply and take-up reels, holding a length of magnetic tape, therein. The casing is generally formed of synthetic resin and the halves thereof are joined by ultrasonic welding, or the like.

For example, one such conventional recording medium containing cartridge is shown in FIGS. 5 and 6. As can be seen in the drawings, the conventional recording medium containing cartridge 100 comprises an upper casing 103 and a lower casing 104. The upper casing 103 has a substantially planar upper surface 101a and a lower side wall portion 102a projecting downwardly around the periphery of the upper surface 101a. Correspondingly, the lower casing 104 has a substantially planar lower surface 101b and an upper side wall portion 102b projecting upwardly around the periphery of the lower surface 101b. The casing is formed so that the lower side wall portion 102a of the upper casing 103 mates with the upper side wall portion 102b of the lower casing 104 via abutting surfaces 107 forming the facing sides of each of the wall portions 102a and 102b. As can further be seen in FIG. 5, the abutting surface portions 107 of the upper side wall portion 102b of the lower casing 104 are provided with energy directing ribs 105 to facilitate joining of the upper and lower halves 103, 104 of the cartridge 100 by, for example, ultrasonic welding, or some similar process.

Referring to FIG. 6, a cross-sectional view of a portion of the upper and lower casings 103, 104 in a joined state is shown. As can be seen in the drawing, after joining of the upper and lower halves 103, 104 has been carried out, a burr 106 projecting inward and outwardly around the periphery of the joined upper and lower casings 103, 104, is formed. As may be seen in FIG. 6, the joined halves 103, 104 of the casing are of subtantially the same height H. The burr 106 corresponds to a center line T at the seam where the upper and lower casing halves 103, 104 are mated.

In such conventional recording medium containing cartridge casings however, drawbacks are present in that the burr 106, projects into the interior of the cartridge casing around the periphery of the casing interior, especially at corners of the casing where a substantially large burr may be formed. The burr 106 is generally located at a center line T of the casing interior, and can cause damage to the magnetic tape during winding and playing operations thereof. This in turn may cause spoilage of products during production and dissatisfaction among recording medium containing cartridge users; this is particularly true during the actual welding process when the burr is formed, as the melted resin may cause damage during production. Also, the presence of such a burr limits the amount of tape which can be accommodated by the tape reels mounted within the cartridge casing.

SUMMARY OF THE INVENTION

It is therefore a principal object of the present invention to overcome the drawbacks of the prior art.

It is a further object of the invention to provide a recording medium containing cartridge in which halves of a casing thereof may be joined while formation of a burr at a joining seam therebetween is prevented.

It is also an object of the invention to provide a recording medium containing cartridge in which tape is protected from a burr formed during a welding process for joining halves of the cartridge casing.

In order to accomplish the aforementioned and other objects, a recording medium containing cartridge is provided, comprising: a first casing shell having a planar portion and a recess formed in the planar portion proximate a side wall portion thereof, the side wall portion having a first abutment surface on an end thereof opposite that mounted on the planar portion; and a second casing shell, having a planar portion and a side wall portion including a second abutment surface corresponding to that of the first casing shell, the second casing shell having a projection formed on the planar portion at a location corresponding to the recess formed in the first casing shell, a dimension of a surface of the projection contacting a bottom of the recess being less than a dimension of the bottom of the recess; a recording medium being mounted between the first and second casing shells.

According to another aspect of the invention, a method for manufacturing a recording medium containing cartridge is provided, comprising the steps of: forming a recess proximate a side wall portion of a first casing shell, forming a projection at a location corresponding to the recess of the first casing shell, a dimension of a surface of the projection contacting a bottom of the recess being less than a dimension of the bottom of the recess, positioning first and second reels between the first and second casing shells so as to be rotatably mounted therebetween according to joining of the first and second casing shells, providing tape between the first and second reels and affixing ends thereof to the first and second reels to be wound therebetween according to rotation of the reels, and joining the first and second casing shells while melting the surface of the projection.

DESCRIPTION OF THE PREFERRED EMBODIMENT

Figure 1:
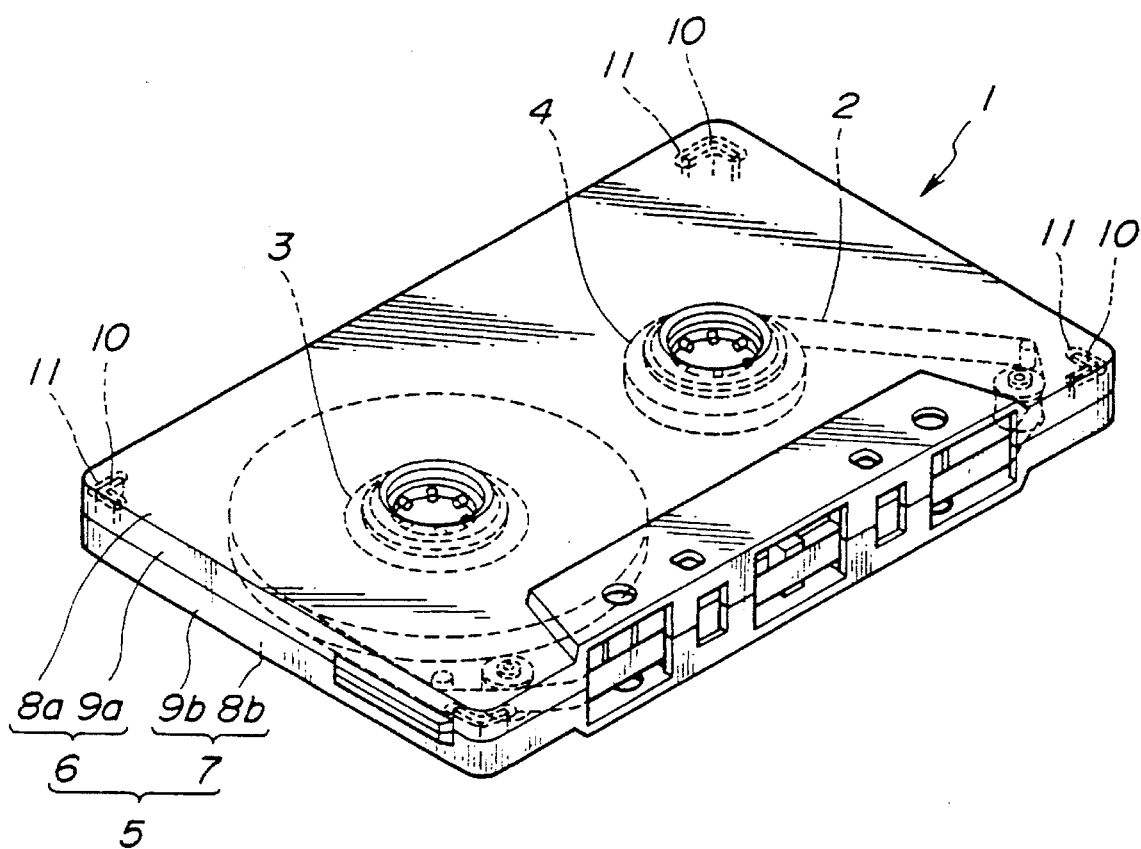
FIG. 1 is a perspective view of a recording medium containing cartridge according to the invention.

Referring now to the drawings, particularly to FIG. 1, a first embodiment of a recording medium containing cartridge according to the invention will be described as applied to a tape cartridge containing a magnetic tape wound therein as a recording medium, although any other type of recording medium may further be utilized. A tape cartridge 1 according to the first embodiment includes casing 5 comprising an upper shell 6, and a lower shell 7. The upper shell 6 includes a substantially planar upper surface portion 8a and a side wall portion 9a extending perpendicularly downward from the upper surface portion 8a at peripheral edges thereof. The side wall portion 9a further includes an abutting surface 21 at a lower side thereof. Likewise, the lower shell 7 includes a substantally planar lower surface portion 8b and a side wall portion 9b extending perpendicularly upward from the lower surface portion 8b at peripheral edges thereof. The side wall portion 9b includes an abutting surface 20 at an upper side thereof, facing the abutting surface 21 of the upper shell.

Figure 2:
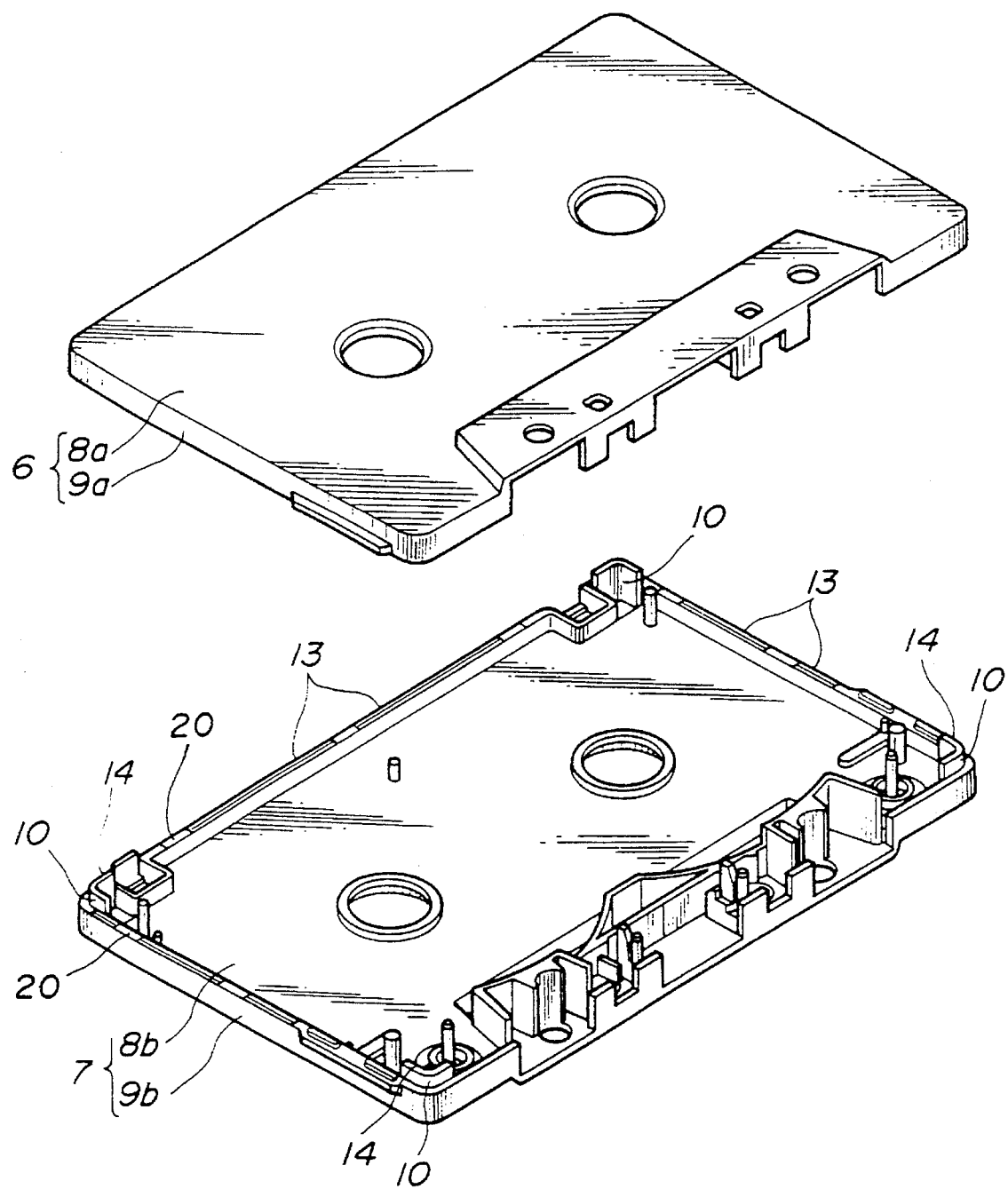
FIG. 2 is a perspective view of an upper and a lower half of a cartridge casing of the recording medium containing cartridge of FIG. 1.
Figure 3:
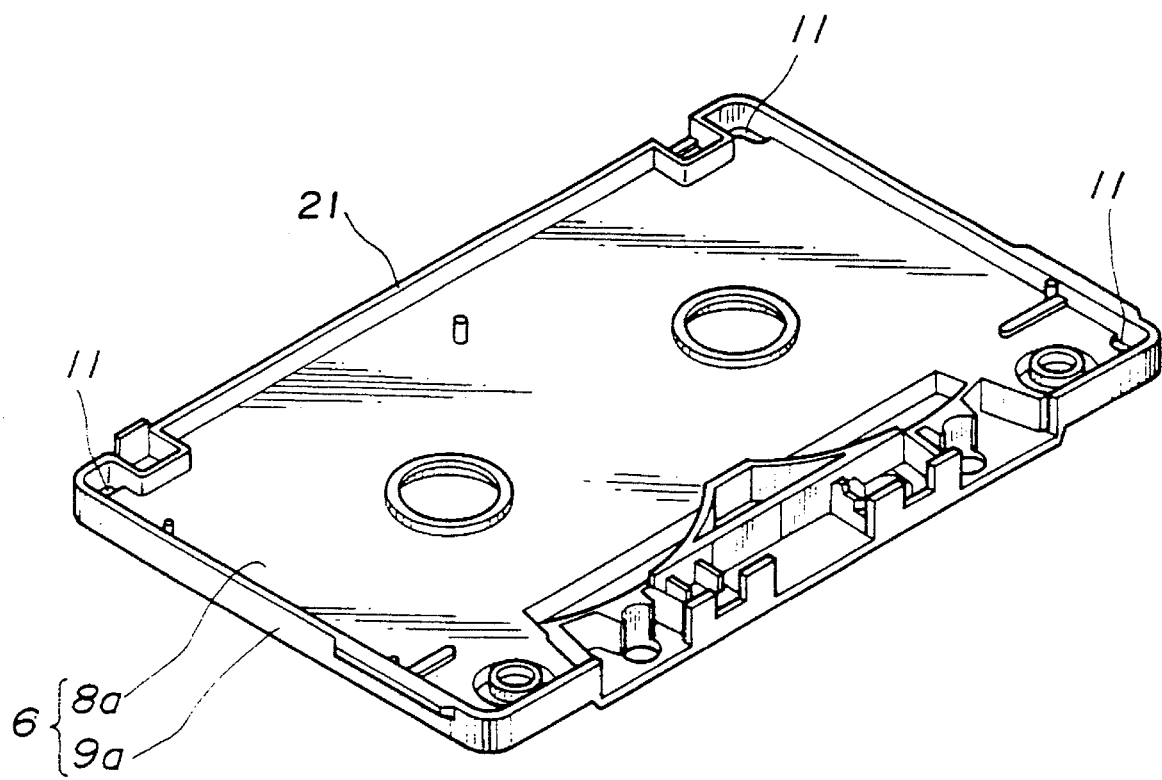
FIG. 3 is a perspective view of an upper half of the cartridge casing of the recording medium containing cartridge of FIG. 1.

In addition, as best seen in FIG. 2, the lower shell 7 has, at each corner thereof, an L-shaped projection 10 formed parallel to, and extending higher than, the side wall portions 9b, at the inside thereof. The L-shaped projections 10 correspond to recessed portions 11, best seen in FIG. 3, which are formed at each corner of the underside of the upper surface portion 8a of the upper shell 6, at a location inside of the side wall portions 9a, so as to receive the L-shaped projections 10 of the lower casing 7 to facilitate joining of the upper and lower shells 6 and 7. Referring again to FIG. 1, in a joined condition, the upper and lower shells 6 and 7 form a cartridge casing 5 rotatably mounting a supply reel 3 and a take-up reel 4 therewithin. The supply and take-up reels 3 and 4 windingly accommodate a length of magnetic tape 2 thereon.

Referring again to FIG. 2, a perspective view of the upper and lower shells 6 and 7 is shown in a state wherein the upper and lower shells 6 and 7 are separated from each other. As can be seen in the drawing, in addition to the above, the lower shell 7 includes, along the abutting surface 20 of the side wall portion 9b, and the edges of the L-shaped projections 10, respectively, welding ribs 13 and 14.

Figure 4:
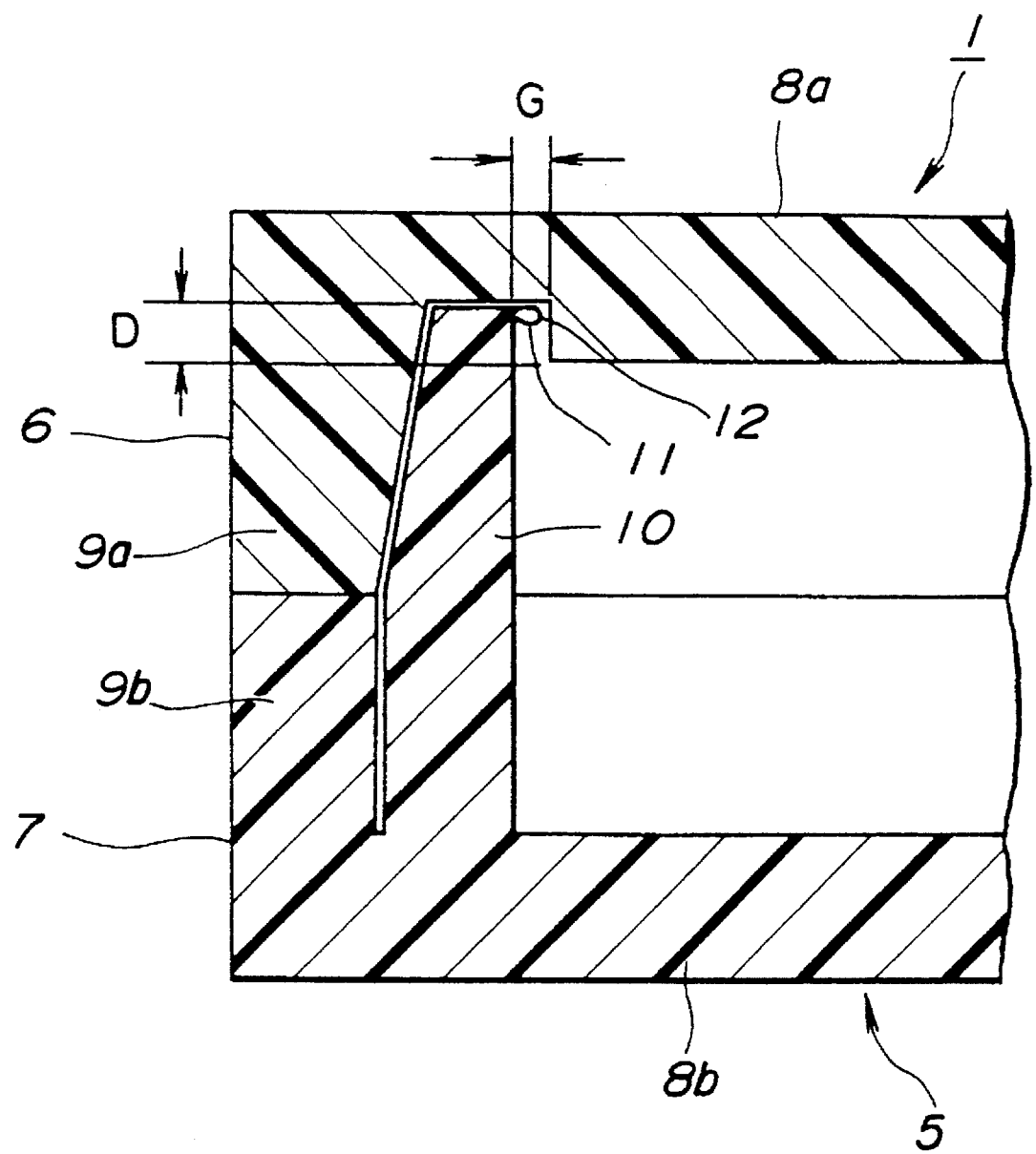
FIG. 4 is a cross-sectional view of a joined portion of the upper and lower halves of the casing of the recording medium containing cartridge of the invention.
Figure 5:
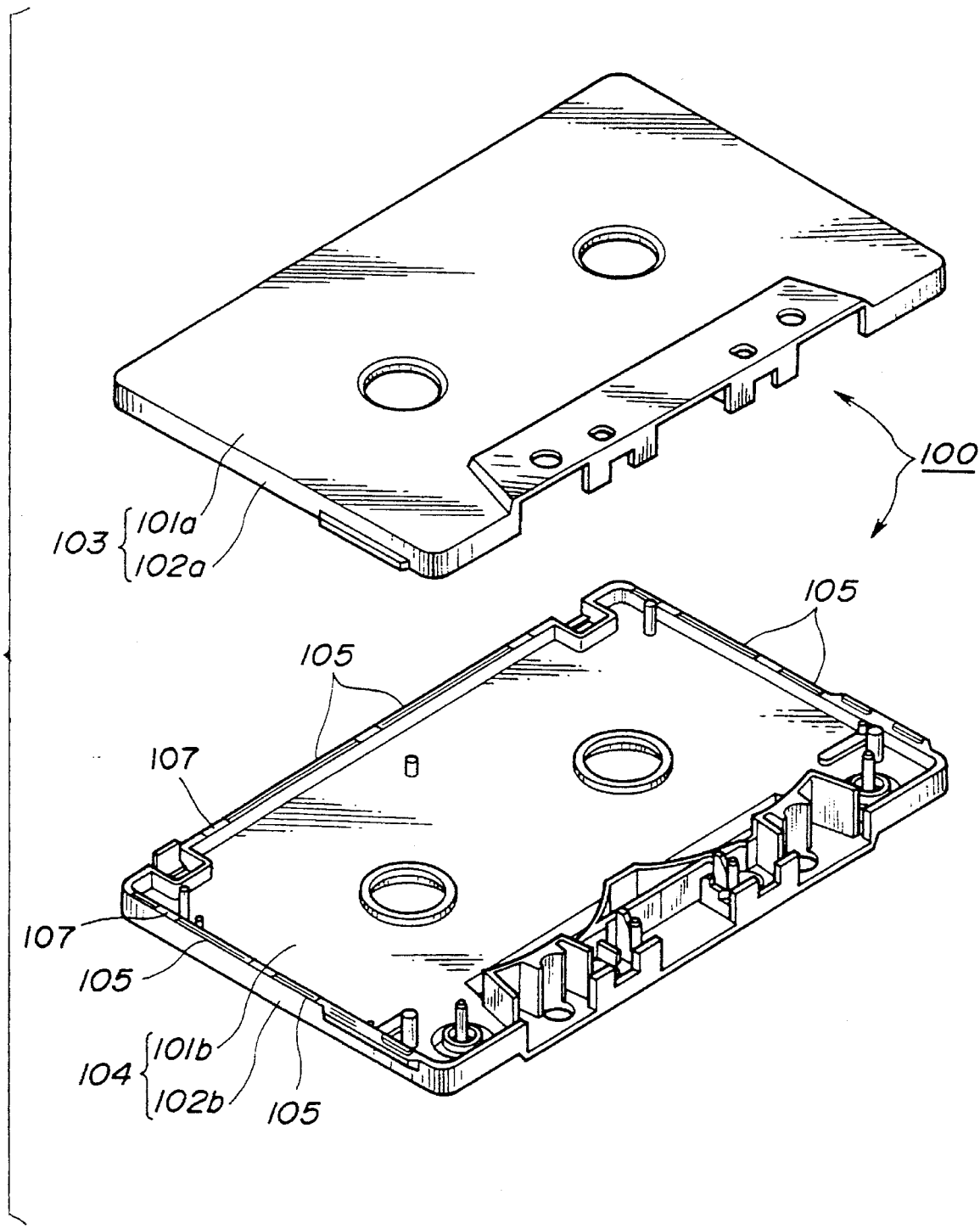
FIG. 5 is an exploded perspective view of a conventional recording medium containing cartridge.
Figure 6:
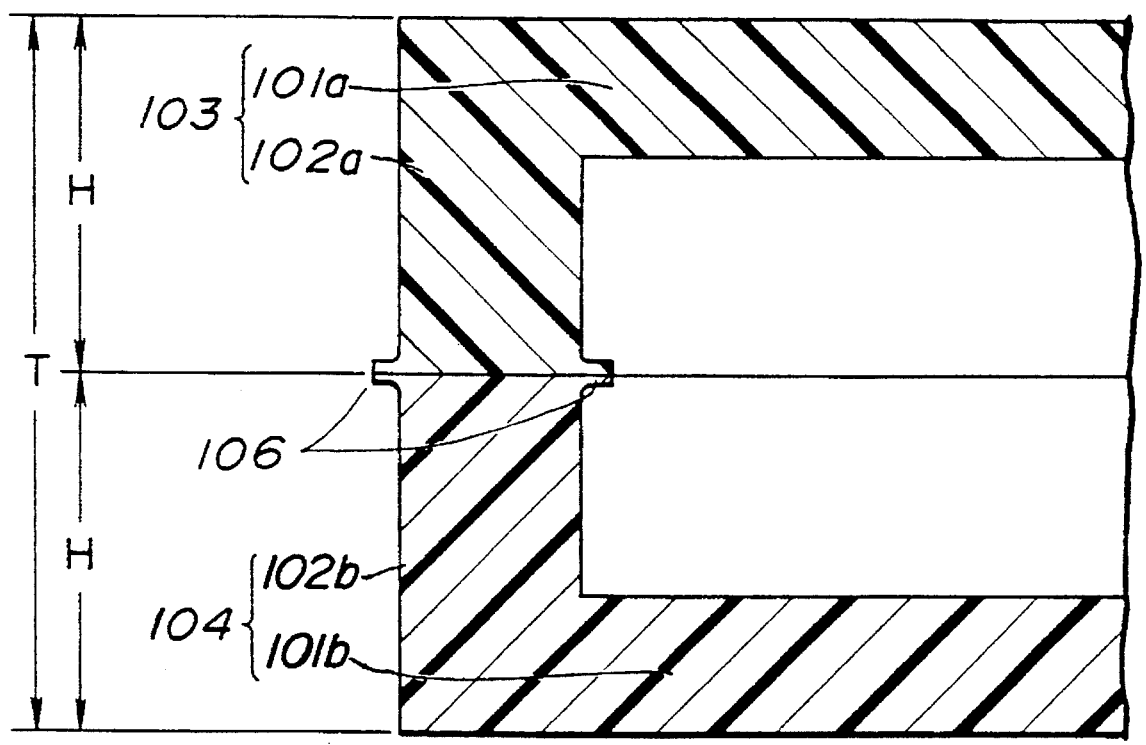
FIG. 6 is a cross-sectional view of a portion of a casing of the conventional recording medium containing cartridge of FIG. 5 for explaining a problem associated with the prior art.

FIG. 4 is a cross-sectional view of a corner portion of the casing shows the casing shells 6, 7 shells 6, 7 in a joined condition, with engagement of the L-shaped projection 10 of the lower shell 7 in the recess 11 of the upper shell 6. As can be seen, the recess 11 has a depth D of, for example, 0.3 mm, in the case of a standard size compact cassette type cartridge. Further, a width of the L-shaped projection is less than that of the recess 11 by a predetermined amount, leaving a gap G. Before welding, the L-shaped projections 10, have a length longer than can be accommodated by the recess 11, 0.5 mm for example; when welding processing is carried out, melting of the welding ribs 13 of the side wall portion 9b and welding ribs 14 at the top of the L-shaped projections 10 occurs and the upper and lower shells 6 and 7 are joined. At this time, the molten portion (including the welding rib 14) of the top or distal surface of the L-shaped projection 10 is moved by the joining pressure of the upper and lower shells 6 and 7, forming a burr 12 in the gap G, and the abutting portions 20 and 21 of the lower and upper shells 7 and 6 are joined; thus the height of the L-shaped projection becomes reduced to be accommodated by the depth D of the recess 11. As seen in the drawing, the burr 12 formed in the welding process is contained in the recess 11 and cannot come into contact with the tape 2 disposed in the cartridge casing 5.

Thus according to the above-described embodiment, the halves of a cartridge casing may be joined while fully protecting the tape therein from formation of a burr at corners of the casing during welding processing.

Further, although the above-described embodiment provides the L-shaped projections in the lower shell 7 and the recesses 11 in the upper shell, this may be reversed; that is, the projections 10 may be provided in the upper shell 6 and the recesses in the lower shell 7 or, each of the upper and lower shells may be provided with a corresponding combination of projections and recesses. Also, although in the present embodiment, the projections are L-shaped and provided in corner portions of the cartridge casing, the projections 10 may alternatively be square, pin shaped, or rectangular and provided at any location along the side walls of the cartridge casing so long as the opposing shell of the casing is formed with an appropriate recess for accepting same. For example, enlongated projections 10 may be provided along the top and each side of the cartridge casing for preventing a burr from intruding into the casing at any portion thereof.

It will be noted that the size of the projection 10 and the depth of the recess 11 as well as the dimension of the gap G is further adaptable depending on the type of casing and degree of welding to be performed. Thus, although the drawings show a standard size, compact audio-type cartridge accommodating magnetic tape thereon, the present invention may be applied to any type of cartridge structure including microcassettes, video cassettes, magnetic and optical disks, digital audio cassettes as well as cartridge type ink ribbon cartridges, typewriter ribbons, head cleaning tapes and the like.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A cartridge for containing a recording medium, said cartridge comprising:

a rectangular first casing shell having a first planar portion, a first side wall mounted on said planar portion and having a first side wall portion substantially perpendicular to a first adjacent side wall portion, and four recesses formed in said first planar portion proximate said first side wall at respective corners of said first casing shell, each of said recesses having a first predetermined width, at least one of said recesses having a first recessed extension substantially parallel to said first side wall portion and a second recessed extension substantially parallel to said first adjacent side wall portion with said first and second recessed extensions converging substantially perpendicular to one another, said first side wall having an edge opposite said first planar portion, said edge forming a first abutment surface;

a rectangular second casing shell having a second planar portion and a second side wall including a second abutment surface engageable with said first abutment surface and having a second side wall portion substantially perpendicular to a second adjacent side wall portion, said second casing shell having four projections formed on said second planar portion at locations corresponding to said four recesses, each of said four projections having a length extending beyond said second side wall and having a contact surface at an extreme end thereof furthest from a point of attachment of said projections to said second casing shell, each said extreme end having a second predetermined width less than said first predetermined width, at least one of said projections having a first projection extension substantially parallel to said second side wall portion and a second projection extension substantially parallel to said second adjacent side wall portion with said first and second projection extensions converging substantially perpendicular to one another, wherein each said contact surface is joined by welding to a bottom surface of a respective one of said recesses for connecting said first casing shell and said second casing shell with said contact surface of said at least one of said projections being joined by said welding to said bottom surface of said at least one of said recesses, a difference between said second predetermined width and said first predetermined width defining a gap between an outer side surface of each said extreme end of each said projection and an inner side surface of each respective said recess when each said projection is inserted in each respective said recess during joining of said first and second casing shells, wherein a burr comprising excess material of each said protection is formed on each said projection when each respective said extreme end is melted during said welding and said burr wholly resides in said gap; and said first and second casing shells enclosing a space for accommodating the recording medium.

2. A cartridge as set forth in claim 1 wherein said first and second side walls extend substantially perpendicularly from outer peripheries of said first and second planar portions, respectively.

3. A cartridge as set forth in claim 1 wherein each of said four projections and said four recesses are L-shaped in a plane parallel to said first planar portion and a plane parallel to said second planar portion, respectively.

4. A cartridge as set forth in claim 1 wherein said length of each said projection is slightly greater than can be accommodated by a depth of each said recess.

5. A cartridge as set forth in claim 1 wherein at least one of said first and second abutment surfaces of at least one of said first and second casing shells is provided with at least one welding rib.

6. A cartridge as set forth in claim 1 further comprising two reels rotatably mounted between said first and second casing shells, said recording medium being a magnetic tape wound on said reels and extending therebetween.

7. A method of manufacturing a cartridge for containing a recording medium, the method comprising the steps of:

forming an L-shaped recess in a corner of a first planar casing shell proximate a first side wall thereof with a first recessed extension of said L-shaped recess being substantially parallel to a first side wall portion of said first side wall and a second recessed extension of said L-shaped recess being substantially parallel to a first adjacent side wall portion of said first side wall, said first and second recessed extensions converging substantially perpendicular to one another, said first and first adjacent side wall portions converging substantially perpendicular to one another, said L-shape being parallel to the plane of said first planar casing shell;

forming an L-shaped projection extending from a second planar casing shell at a location proximate a second side wall and corresponding to a location of said L-shaped recess formed in said first casing shell with a first projection extension of said L-shaped projection being substantially parallel to a second side wall portion of said second side wall and a second projection extension of said L-shaped projection being substantially parallel to a second adjacent side wall portion of said second side wall, said first and second projection extensions converging substantially perpendicular to one another, said second and second adjacent side wall portions converging substantially perpendicular to one another, said L-shape being parallel to the plane of said second planar casing shell;

forming a width of an extreme end of said L-shaped projection furthest from a point of attachment of said projection to said second casing shell to be less than a width of said recess so as to form an L-shaped gap between a side surface of said extreme end of said projection and a side surface of said recess;

positioning first and second reels between said first and second casing shells so as to be rotatably mounted therebetween upon joining of said first and second casing shells;

providing said recording medium between said first and second reels and affixing ends thereof to said first and second reels to be wound therebetween upon rotation of said reels;

bringing together said first and second planar casing shells, so that an end surface of said extreme end of said L-shaped projection contacts a bottom surface of said L-shaped recess; and welding together said first and second casing shells by melting said extreme end of said projection so that said extreme end is joined to said bottom surface of said recess and excess material caused by said melting resides wholly in said gap between said side surface of said extreme end of said L-shaped projection and said side surface of said L-shaped recess.

* * * * *